(12) United States Patent
Takahashi (10) Patent No.: US 7,104,551 B2
(45) Date of Patent: Sep. 12, 2006

(54) SLIDING DEVICE FOR SNOW SPORTS (75) Inventor: Tetsu Takahashi, Yokosuka (JP)

(73) Assignee: Jykk Japan Inc., (JP)

( * ) Notice: Subject to any disclaimer, the term of this patent is extended or adjusted under 35 U.S.C. 154(b) by 0 days.

(21) Appl. No.: 10/276,049

(22) PCT Filed: May 11, 2001

(86) PCT No.: PCT/JP01/03933

§ 371 (c)(1),
(2), (4) Date: Sep. 2, 2003

(87) PCT Pub. No.: WO01/85526

PCT Pub. Date: Nov. 15, 2001

(65) Prior Publication Data
US 2004/0017052 A1    Jan. 29, 2004

(30) Foreign Application Priority Data
May 12, 2000    (CN) ................................. 00 1 08373

(51) Int. Cl.
B62B 13/04    (2006.01)

(52) U.S. Cl. ............................... 280/14.25; 280/14.27; 280/17; 280/22.1

(58) Field of Classification Search ................ 280/845, 280/12.1, 12.13, 12.14, 11.14, 14.21, 14.25, 280/14.27, 14.28, 21.1, 22, 28.14, 87.021, 280/87.041
See application file for complete search history.

(56) References Cited

U.S. PATENT DOCUMENTS

| 1,945,170 | A | * | 1/1934 | Wetzel | 280/14.28 |
|---|---|---|---|---|---|
| 2,449,336 | A | * | 9/1948 | Spitzwieser | 280/14.28 |
| 3,638,960 | A | * | 2/1972 | Eaton | 280/16 |
| 3,717,359 | A | * | 2/1973 | Peronnon et al. | 280/16 |
| 3,870,330 | A | * | 3/1975 | Hatano et al. | 280/16 |
| 4,097,055 | A | * | 6/1978 | Laycraft | 280/16 |
| 4,708,353 | A | * | 11/1987 | Evequoz | 280/16 |
| 4,773,659 | A | * | 9/1988 | Rygiel | 280/142 |
| 4,848,781 | A | * | 7/1989 | Dykema et al. | 280/14.21 |
| 4,852,898 | A | * | 8/1989 | Donoghue et al. | 280/216 |
| 5,351,975 | A | * | 10/1994 | Petoud | 280/14.28 |
| 5,613,695 | A | * | 3/1997 | Yu | 280/14.25 |
| 5,799,956 | A | * | 9/1998 | Shannon | 280/14.21 |
| 5,863,051 | A | * | 1/1999 | Brenter | 280/16 |
| 5,984,344 | A | * | 11/1999 | Harsanyi et al. | 280/602 |
| 6,279,923 | B1 | * | 8/2001 | Cardillo et al. | 280/12.14 |
| 6,302,415 | B1 | * | 10/2001 | Wang et al. | 280/87.041 |
| 6,736,414 | B1 | * | 5/2004 | Farrally-Plourde | 280/16 |
| 6,783,134 | B1 | * | 8/2004 | Geary | 280/21.1 |
| 6,789,806 | B1 | * | 9/2004 | Santa Cruz et al. | 280/14.21 |

(Continued)

FOREIGN PATENT DOCUMENTS

DE    200 14 985    12/2000

(Continued)

Primary Examiner—Jeff Restifo
(74) Attorney, Agent, or Firm—DLA Piper Rudnick; Gray Cary US LLP (57) ABSTRACT A sliding device for snow is provided with a supporting slide (1) and a turning slide (2) arranged in front of the supporting slide. The smallest portion of said turning slide (2) is wider than the widest portion of the supporting slide (1). The ground contact portion (2a) of said turning slide spreads out forward and is essentially a trapezoid-like plate. The largest width of this ground contact portion is about 1.01–1.1 times the smallest width of the ground contact portion.

20 Claims, 5 Drawing Sheets

U.S. PATENT DOCUMENTS

| | | | |
|---|---|---|---|
| 6,834,881 B1 * | 12/2004 | Mash | 280/607 |
| 6,994,359 B1 * | 2/2006 | Silver | 280/16 |
| 2003/0116941 A1 * | 6/2003 | Mash | 280/607 |
| 2004/0007838 A1 * | 1/2004 | Farmer | 280/14.27 |
| 2004/0075227 A1 * | 4/2004 | Jungnickel | 280/14.21 |

FOREIGN PATENT DOCUMENTS

| | | | |
|---|---|---|---|
| DE | 200 18 795 | 1/2001 | |
| FR | 2830828 A1 * | 4/2004 | 280/845 |
| FR | 2831127 A1 * | 4/2004 | 280/845 |
| FR | 2817226 A1 * | 5/2004 | 280/845 |

* cited by examiner

SLIDING DEVICE FOR SNOW SPORTS

FIELD OF THE INVENTION

The present invention relates to a sliding device for snow sports.

BACKGROUND

A sliding device is disclosed in U.S. Pat. No. 5,351,975, wherein the turning slide is round-shaped and the supporting slide is essentially a rectangular plate having a rounded front end. A stabilizing bar is provided between a sleeve in which the fork is rotatable and the front end of the supporting slide, so that this stabilizing bar is positioned before the rider's feet, which are to be positioned on a supporting plate provided on the supporting slide.

Such a sliding device presents some problems. Since the front portion of the turning slide is round-shaped, the sliding device cannot move in a straight line properly. While the sliding device moves forward in curves, the length of the edge of the turning slide in contact with the snow is relatively short; therefore, the edge effect does not function well and changing direction is difficult.

SUMMARY OF THE INVENTION

The invention provides a sliding device in such a way that the device is capable of moving in a straight line properly, whereas it is easy to perform curves when riding on the sliding device.

The invention further improves the stability of the device.

BRIEF DESCRIPTION OF THE DRAWINGS

The objects, details, advantages and the further features of the present invention will become apparent from the following description and claims in conjunction with the drawings, which show an example of a sliding device according to the present invention.

DETAILED DESCRIPTION OF THE INVENTION

The total length of the sliding device for an adult rider in accordance with the present invention is about 1.5 m. The sliding device comprises a supporting slide 1 and a turning slide 2, wherein the turning slide 2 is arranged in front of the supporting slide 1. The turning slide 2 is connected with the supporting slide 1 by means of a front fork 3 extending from the lower portion of a rotating arm 4. The rotating arm 4 can freely rotate in a sleeve 5 of a frame comprising two rigid struts 6 and a stabilizing bar 10. The sleeve 5 is inclined in relation to the ground and the angle of the inclination can be, for example, 65°. The two rigid struts 6 are welded to the lower portion of said sleeve 5 and can be made of metal tubes. The tubular struts 6 extend downwardly from the front ends and continuously spread outward, until they reach the supporting slide 1. The struts 6 then continue as frame extensions 6a arranged longitudinally on the supporting slide 1. In the middle part of the supporting slide 1 the frame extensions are interrupted in such a way that a rear portion of the frame extensions 6a' can pivot around a hinge 9a or a flexible connection in relation to the front frame extensions 6a as shown by arrow X in FIG. 6.

Both frame extensions 6a and 6a' extend along the side edges of the upper surface of the supporting slide 1. The rear ends of the rear frame extensions 6a' are inclined upward after they diverge from the supporting slide 1. The rear frame extensions 6a' are connected to each other via a rounded rear portion 6a".

Between the tubular struts 6 of metal and the frame extensions 6a and 6a' on said supporting slide 1, a supporting plate 11 for placing the rider's feet is disposed. A rectangular rigid plate made of metal preferably forms the main body of the supporting plate 11.

The two lateral edges of the supporting plate 11 are preferably welded along their entire length to the inner sides of the frame extensions 6a and 6a'. Moreover, the supporting plate 11 for placing the rider's feet can be attached to the supporting slide 1 by screws in at least four locations, the two lateral sides, the rear side and the front side, such that the supporting plate 11 and the supporting slide 1 are firmly connected to each other. This supporting plate 11 is divided by the hinge 9a or a flexible connection into a front plate 11' and a rear plate 11", wherein the front plate 11' is firmly connected with the frame extensions 6a and the rear plate 11" is firmly connected with the rear frame extensions 6a'.

The tubular struts 6 and the supporting plate 11 are preferable welded together in advance, and the combination is then attached to the supporting slide 1 by screws. The supporting plate 11 is preferably covered with non-skid material, such as rubber, on the surface which is in contact with the rider's feet.

Figure 3:
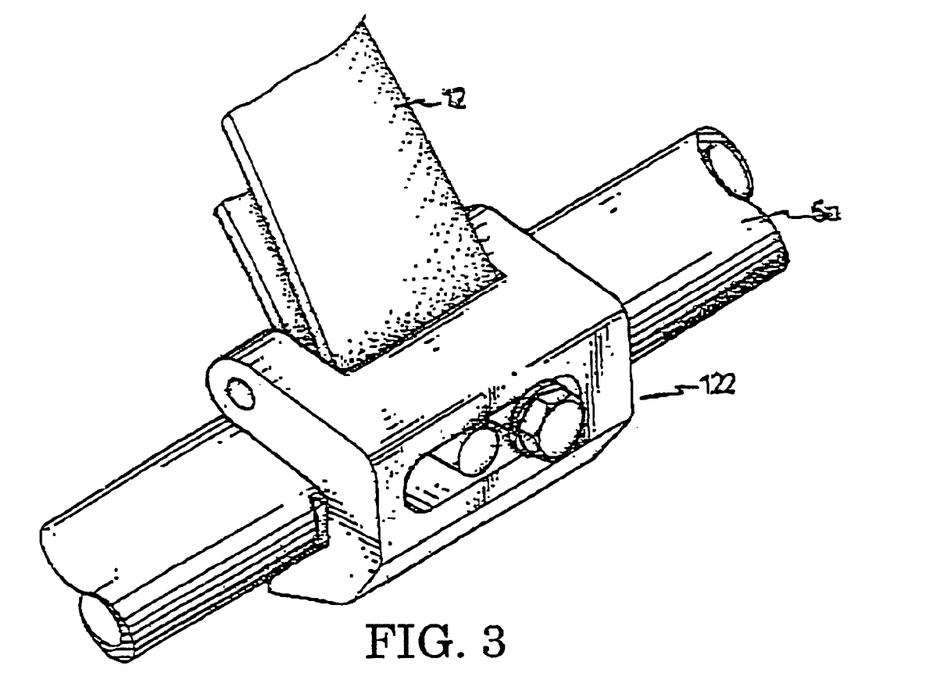
FIG. 3 is a perspective view of the connector for the foot strap on the sliding device in FIG. 1.

On the front supporting plate 11', a slipper-like foot strap 12 is attached to the frame extensions 6a. The foot strap 12 can loosely keep the rider's two feet side by side, in the longitudinal or lateral direction on the supporting plate 11. The foot strap 12, as shown in FIG. 3, can be adjusted back and forth on the frame extensions 6a by fasteners 122 previously mounted at the two sides of the frame extensions 6a. In addition, the foot strap 12 can be formed from a shape memory alloy and is provided with an adjustment means 121 to change the size of the foot strap 12 to accommodate the size of a specific rider's feet. Thus, the position of the rider on the sliding device is capable of being properly adjusted to depend on the desire or body build of the rider by adjusting the length of the foot strap 12.

The upper portion of the sleeve 5 is attached to the stabilizing bar 10 formed from a metal tube. The front end of the bar 10 is connected to the sleeve 5, and the bar 10 then extends downwardly and rearwardly to the rear supporting plate 11". A shock absorber 101 is mounted near the central portion of the bar 10, so that the bar 10 is divided by the shock absorber into a front portion 10 and a rear portion 10'. The rear end of the rear portion 10' is attached to the rear supporting plate 11" or at the supporting slide 1 by means of a pivot in the form of a bracket 9 or the like. Said shock absorber 101 can be made of rubber, be hydraulic or be a spring. In addition, to prevent the shock absorber 101 from moving up and down or back and forth, a tube covers the entire shock absorber 101. The tube is used to guide the shock absorber 101 and connect the shock absorber 101 to the rear portion 10' of the bar and to the rear supporting plate 11", where the bracket 9 or the like is mounted.

Further, a spring can be provided for the shock absorber, which spring is positioned between the front portion 10 of the bar and the rear portion 10', wherein both portions 10 and 10' are guided in the form of a spring biased telescope.

Figure 6:
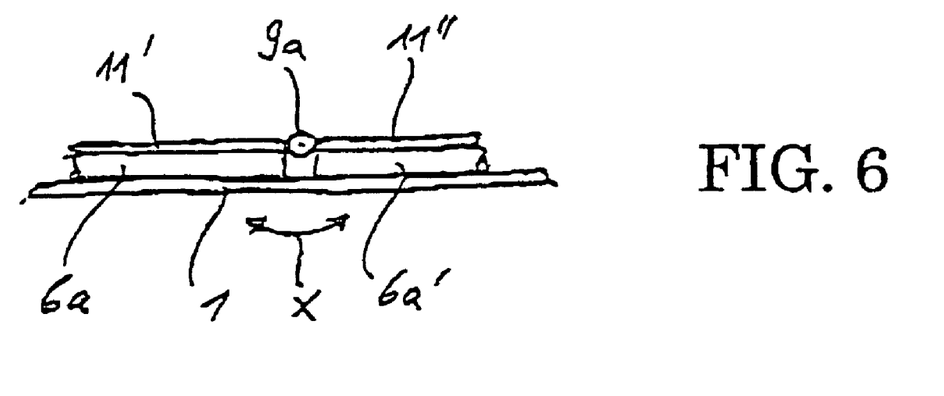
FIG. 6 shows schematically a side view of a hinge on the supporting plate.

FIG. 6 shows schematically the hinge 9a between front and rear portions 11' and 11" of the supporting plate 11.

These front and rear portions 11' and 11" are firmly connected with the frame extensions 6a and 6a' respectively, which are separated from each other so that the supporting slide 1 can be bent around the axis of the hinge 9a or flexible connection when riding on the sliding device as shown by arrow X.

Instead of a hinge 9a between front and rear portion 11' and 11" of the supporting plate 11, a flexible connection can also be provided between these two portions such a flexible connection can also be provided between the frame extensions 6a and 6a'.

As described previously, the entire length of the sliding device is 150 cm, and the length of the supporting slide 1 is about 95 cm. The front fifth of the supporting slide 1 is curved up until the height of the front end is about 10 cm. Moreover, the rear end of the supporting slide 1 is likewise curved up until its height is about 1 cm. With the configuration described above, the main portion of the supporting slide 1 is a substantially rectangular ground contact portion 1a and the width of the curved front portion of the supporting slide 1 is gradually narrowed toward the front end.

Figure 2:
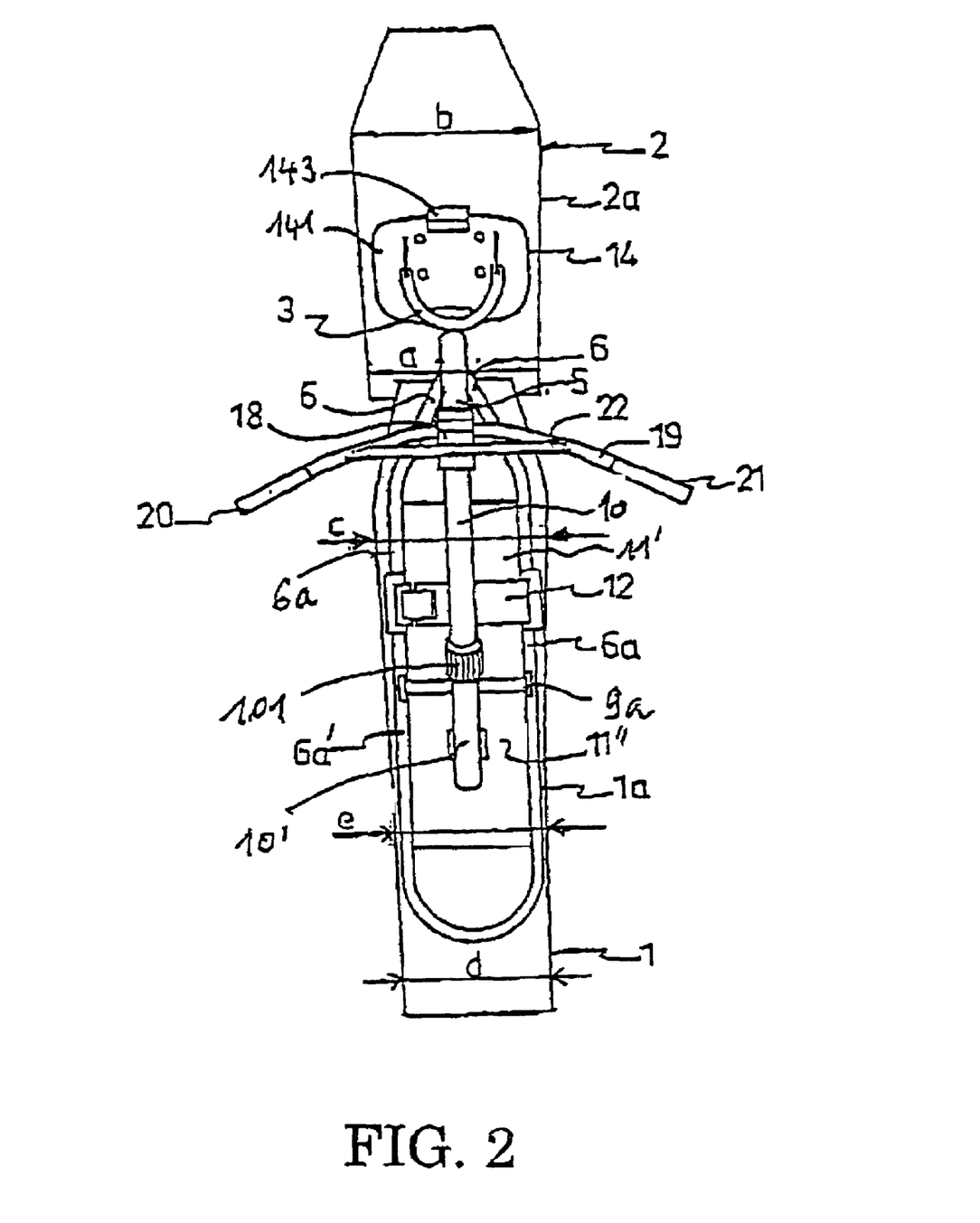
FIG. 2 is a top view of the sliding device in FIG. 1.

With reference to FIG. 2, said ground contact portion 1a of the supporting slide 1 is widest at location c near the front end. For example, when the total length of the supporting slide 1 is about 95 cm, the width at location c is preferred to be 22 cm. The width of the ground contact portion 1a becomes smaller from location c to the smallest width at location e, where the width is approximately 20 cm. The width again becomes larger after location e until the rear portion at location d, and the width after location d is constant at approximately 21.5 cm. That is, the supporting slide 1 is not a parallelogram, and its width is smallest at the rear portion at location e in the area of the rear supporting plate 11" or behind the hinge 9a.

Figure 1:
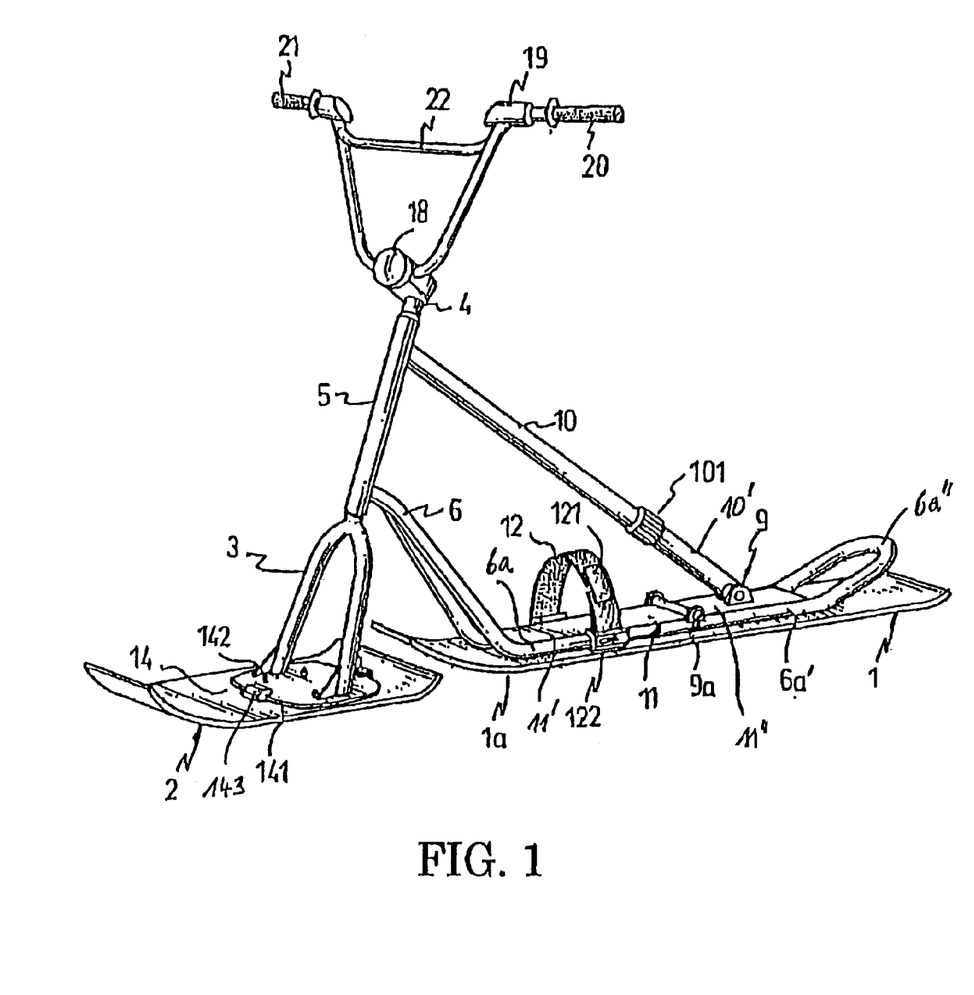
FIG. 1 is a perspective view of the sliding device according to the invention.

With reference to FIGS. 1 and 2, the front portion and the rear portion of said turning slide 2 are preferred to be curved up, like the supporting slide 1, and the main portion at the center of the turning slide 2 is the ground contact portion 2a. The total length of the turning slide 2 is preferred to be approximately 53 cm when the total length of the supporting slide 1 is 95 cm. Preferably, the height of the front end of the turning slide 2 is approximately 5 cm, and the height of the rear end is approximately 1 cm. The ground contact portion 2a of the turning slide 2 is not a parallelogram with a smallest width of approximately 26 cm at location a on the rear end. The width of the turning slide 2 becomes larger toward the front, until the largest width of about 27 cm, at location b on the front end of the ground contact portion 2a. Namely, the ground contact portion 2a of the turning slide 2 is a trapezoid-like plate, which is gradually wider toward the front. As described above, the smallest portion of the turning slide 2 is wider than the widest portion at location c of the supporting slide 1.

Specifically because of the shape of the ground contact portion 2a of the turning slide 2, curves are made more efficiently with the sliding device. When making a curve, the handlebar is turned left or right and the respective left edge or the right edge of the turning slide 2 can instantly act on the ground. The sliding device can thus immediately and efficiently perform the desired curve. From various kinds of testing, good results can be achieved by setting the largest width (the width of the front end at location b) of the ground contact portion 2a to be approximately 1.01–1.1 times the smallest width (the width of the rear end at a) of the ground contact portion 2a.

Figure 4:
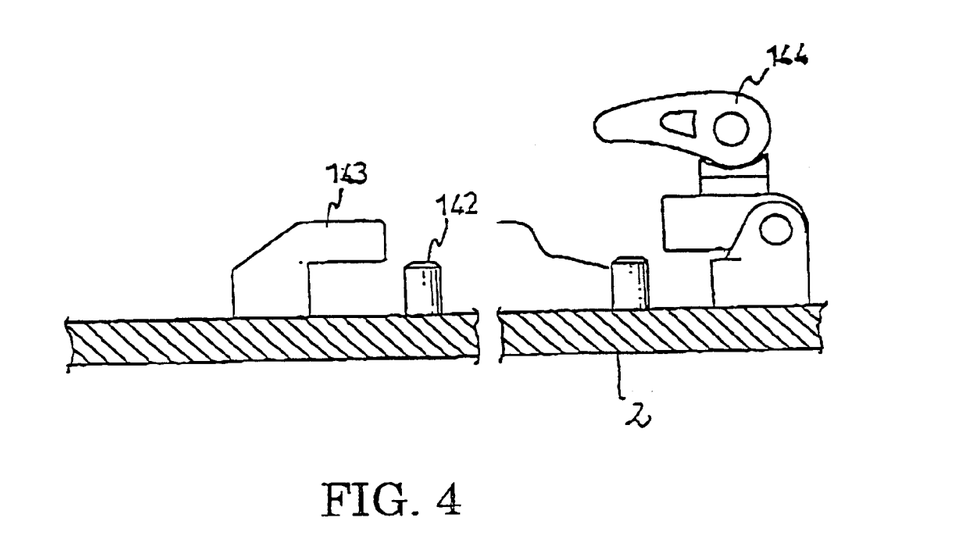
FIG. 4 is a side plan view in partial section of a quick release system.
Figure 5:
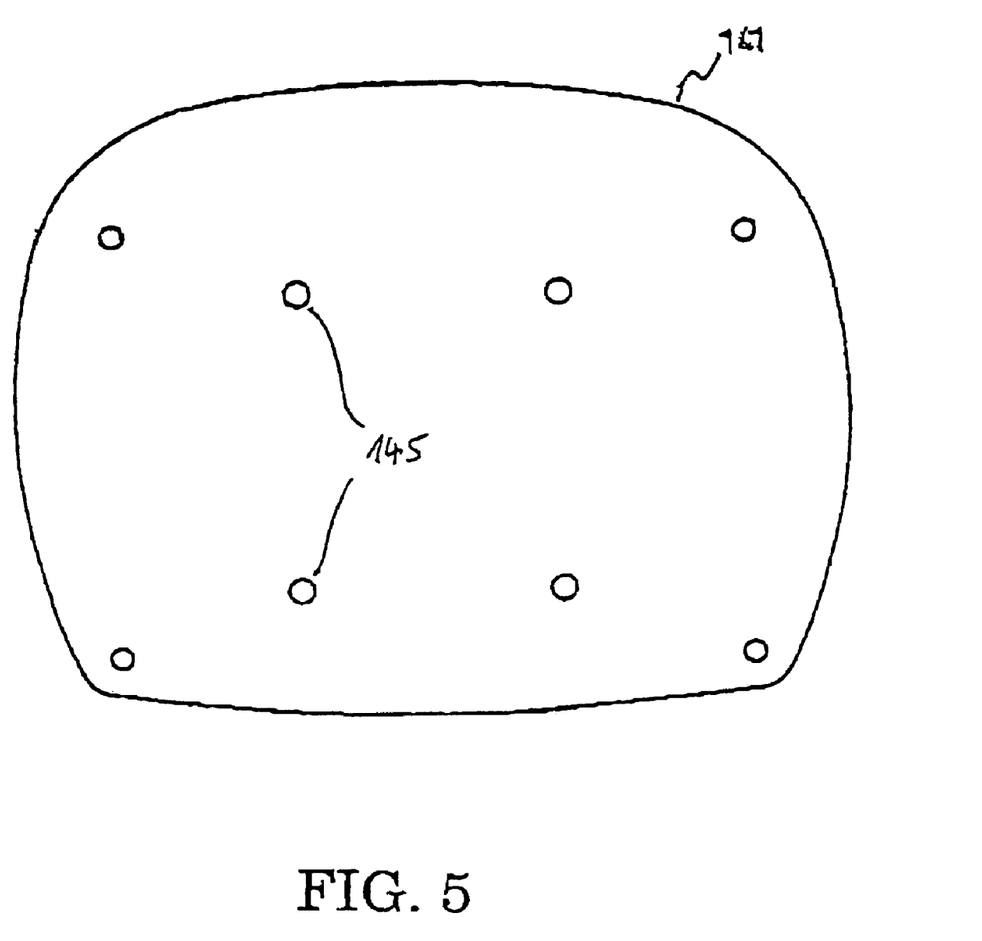
FIG. 5 is a top view of the supporting plate of the quick release system.

The maintenance, movement and storage of the sliding device are achieved by means of a quick release system 14. The conveniently assembled or disassembled quick release system 14 is fastened at the lower end of the front fork 3. With reference to FIGS. 1, 4 and 5, the quick-release system 14 comprises a supporting plate 141 firmly connected with the fork and fastening elements 143, 144 provided on the turning slide 2. Position guide posts 142 for positioning the fork 3 are provided on the turning slide 2 and are inserted in the rounded-contoured supporting plate 141 through positioning holes 145 (FIG. 5). The position guide posts 142 can be embodied as screws inserted into the upper surface of the turning slide 2. Additionally screws can be used for fastening the guide posts on the supporting plate 141. The quick release system comprises an L-shaped lip 143 and a locking clamp 144, which are fastened on the turning slide 2 by means of screws. When connecting the quick release system 14 to the turning slide 2, first insert the front edge of the supporting plate 141 under the lip 143, then insert the position guide posts 142 into the positioning holes 154 and clamp the rear edge of the supporting plate 141 with the locking clamp 144. Said supporting plate 141 has rounded contours, such that the stresses on the supporting slide 2 generated from jumps or special sliding stunts can be diverted. Thus the turning slide 2 is provided with a high efficiency support to prevent the slide from breaking.

Such a quick release system can also be provided between supporting slide 1 and frame extensions 6a and 6a' or the supporting plate 11 respectively.

The foremost end of the supporting slide 1 overlaps the rearmost end of the turning slide 2 by being separated from each other in the vertical direction. The overlap length of the slides is preferred to be about 5 cm. Although not shown in the figures, a shaft is fitted in the upper end of said rotating arm 4, and the shaft can slide in the rotating arm 4. Consequently, the height of the rotating arm is adjustable. An adjustable head connector 18 protruding forward is mounted at the upper end of the rotating arm 4. The head connector 18 holds the handlebar 19 at the central portion of the handlebar 19, wherein the length of the handlebar 19 is approximately 70 cm. The handlebar 19 is provided with grips 20, 21 at the lateral sides, such that the rider can hold the grips 20, 21 and thereby control the sliding device. A stabilizer bar 22 is attached between the grips 20, 21 to enhance the strength of the handlebar 19. The longitudinal location of the grips 20, 21 is preferred to be between the front end of the supporting slide 1 and the rear end of the turning slide 2 when the turning slide 2 is aligned with the supporting slide 1.

When riding on the sliding device, the stabilizing bar 10 can be used to assist in performing curves by squeezing the bar 10 tightly between the rider's legs, wherein the rider can easily lean his weight to the edge of the turning side when making a curve. To perform such weight transformation efficiently, it is preferable to fasten the entire supporting plate 11 to the supporting slide 1 as firmly as possible, also in case of quick release system.

The supporting slide 1 and the turning slide 2 are both made from known laminated material of synthetic resin for snow boards or skis, such as wood, metal, glass fiber, carbon fiber, etc. The bottom edges of the slides are preferably enhanced with a sharp metal runner to protect the surface of the slides from the friction between the slides and the icy ground, especially from the friction generated during a sliding turn, and the so-called edge status when making a sliding turn.

The sliding device in accordance with the present invention, especially the structure of the turning slide described above, the sliding runner of the supporting slide 1 is always coincident with that of the turning slide 2 when sliding, even when the turning slide 2 is turned by the handlebar 19. Therefore, a ride can perform the sliding turn properly.

With the sliding device described above, even on soft powder snow ground or when the rider performs jumps or special sliding feats, it is possible to perform the sliding in a stable and smooth manner.

The dimensions of the components shown in the embodiments are generally for adult riders. However, if the riders are children, the dimensions can be changed accordingly.

The invention claimed is:

1. A sliding device for snow sports comprising:
   a supporting slide;
   a foot supporting plate connected to the supporting slide along the length of the foot supporting plate, the foot supporting plate having a front portion, a rear portion, and a flexible portion or hinge between the front and rear portions to allow the rear portion to pivot relative to the front portion, thereby permitting the supporting slide to bend upward or downward;
   a turning slide;
   a frame comprising struts, a stabilizing bar and a sleeve, wherein the struts and the stabilizing bar are provided between the sleeve and the foot supporting plate on the supporting slide; and
   a rotating arm guided in the sleeve of the frame and connected to the turning slide.

2. The sliding device according to claim 1, wherein the stabilizing bar is pivotally connected to the rear portion of the foot supporting plate and is provided with a shock absorber.

3. The sliding device according to claim 2, wherein the shock absorber is made of rubber, constituted hydraulically or is a spring, and is mounted in the central portion of said stabilizing bar.

4. The sliding device according to claim 2, wherein frame extensions extend along the sides of the foot supporting plate and are divided into a front portion and a rear portion in the area of the hinge or flexible portion.

5. The sliding device according to claim 1, wherein frame extensions extend along the sides of the foot supporting plate and are divided into a front portion and a rear portion in the area of the hinge or flexible portion.

6. The sliding device according to claim 5, wherein said frame extensions extend longitudinally along the lateral sides of the supporting slide, said foot supporting plate is substantially formed of rigid material and is connected to said frame extensions by welding the entire length of the lateral sides of the foot supporting plate to the frame extensions.

7. The sliding device according to claim 6, wherein at the front portion of said foot supporting plate, a foot strap is mounted on said frame extensions, and said foot strap can loosely keep a rider's two feet side by side, in the longitudinal or lateral direction on the supporting plate.

8. The sliding device according to claim 7, wherein said foot strap is formed from shape memory alloy and is provided with an adjustment means to accommodate the size of different riders' feet.

9. The sliding device according to claim 5, wherein the supporting slide is connected with the frame extensions or with the foot supporting plate via a quick release system.

10. The sliding device of claim 1, wherein a smallest portion of the turning slide is wider than a widest portion of the supporting slide, and a ground contact portion of said turning slide is wider at a forward portion and is substantially a trapezoid-shaped plate, the largest width of the ground contact portion being approximately 1.01–1.1 times the smallest width of the ground contact portion.

11. The sliding device according to claim 10, wherein the lower end of a fork is connected to said turning slide at a position on said turning slide about one fourth of the entire length of the turning slide from the rear end of the turning slide by means of a quick release system.

12. A sliding device for snow sports comprising:
    a supporting slide;
    a foot supporting plate connected to the supporting slide along the length of the foot supporting plate, the foot supporting plate having a front portion and a rear portion, and further having a flexible portion or hinge to allow the rear portion to pivot relative to the front portion, thereby permitting the supporting slide to bend upward or downward;
    a turning slide;
    a frame comprising struts, a stabilizing bar and a sleeve, wherein the struts and the stabilizing bar are provided between the sleeve and the foot supporting plate on the supporting slide, and wherein the stabilizing bar is pivotally connected to the rear portion of the foot supporting plate and is provided with a shock absorber; and
    a rotating arm guided in the sleeve of the frame and connected to the turning slide.

13. The sliding device according to claim 12, wherein the shock absorber is made of rubber, constituted hydraulically or is a spring, and is mounted in the central portion of said stabilizing bar.

14. The sliding device according to claim 12, wherein frame extensions extend along the sides of the foot supporting plate and are divided into a front portion and a rear portion in the area of the hinge or flexible portion.

15. A sliding device for snow sports comprising:
    a supporting slide;
    a foot supporting plate connected to the supporting slide along the length of the foot supporting plate, the foot supporting plate having a front portion, a rear portion, and a flexible portion or hinge connected to the front and rear portions to allow the rear portion to pivot relative to the front portion, thereby permitting the supporting slide to bend upward or downward;
    a turning slide;
    a frame comprising struts, a stabilizing bar and a sleeve, wherein the struts and the stabilizing bar are provided between the sleeve and the foot supporting plate on the supporting slide; and
    a rotating arm guided in the sleeve of the frame and connected to the turning slide.

16. The sliding device according to claim 15, wherein frame extensions extend along the sides of the foot supporting plate and are divided into a front portion and a rear portion in the area of the hinge or flexible portion.

17. The sliding device according to claim 16, wherein said frame extensions extend longitudinally along the lateral sides of the supporting slide, said foot supporting plate is substantially formed of rigid material and is connected to said frame extensions by welding the entire length of the lateral sides of the foot supporting plate to the frame extensions.

18. The sliding device according to claim 17, wherein at the front portion of said foot supporting plate, a foot strap is mounted on said frame extensions, and said foot strap can loosely keep a rider's two feet side by side, in the longitudinal or lateral direction on the supporting plate.

19. The sliding device according to claim 18, wherein said foot strap is formed from shape memory alloy and is provided with an adjustment means to accommodate the size of different riders' feet.

20. The sliding device of claim 15, wherein a smallest portion of the turning slide is wider than a widest portion of the supporting slide, and a ground contact portion of said turning slide is wider at a forward portion and is substantially a trapezoid-shaped plate, the largest width of the ground contact portion being approximately 1.01–1.1 times the smallest width of the ground contact portion.

* * * * *